United States Patent [19]
Brossard et al.

[11] Patent Number: 5,263,521
[45] Date of Patent: Nov. 23, 1993

[54] DEVICE FOR FORMING A VANE JOINING TWO CONTAINERS IN A WATER PROOF MANNER AND A DESIGN FOR ATTACHING A CONTAINER TO SUCH A DEVICE

[75] Inventors: Jean-Pierre Brossard, Chakau; Dominique Cagnac, Dourdan; Claude Gerard, La Ville Aux Clercs, all of France

[73] Assignee: SNE La Calhene, France

[21] Appl. No.: 849,874

[22] Filed: Mar. 12, 1992

[30] Foreign Application Priority Data
Mar. 14, 1991 [FR] France .................... 91 03116

[51] Int. Cl.⁵ ............................................. B65B 1/04
[52] U.S. Cl. ..................................... 141/384; 141/98; 141/292; 141/346
[58] Field of Search ............ 141/93, 98, 217, 292, 141/312, 346, 347, 348, 349, 350, 387, 384, 313, 314; 414/217, 292, 221

[56] References Cited

U.S. PATENT DOCUMENTS

| | | | |
|---|---|---|---|
| 3,377,775 | 4/1968 | Mattimoe et al. | 325/395 |
| 4,616,683 | 10/1986 | Tullis et al. | 141/98 |
| 5,056,571 | 10/1991 | Derby | 141/314 |
| 5,066,186 | 11/1991 | Shimada et al. | 414/221 |

FOREIGN PATENT DOCUMENTS

1329563 5/1963 France .
0088735 9/1983 France .

*Primary Examiner*—Henry J. Recla
*Assistant Examiner*—David J. Walczak
*Attorney, Agent, or Firm*—Pearne, Gordon, McCoy & Granger

[57] ABSTRACT

A waterproof fixture (14) is attached to the hopper (12) for transferring a powder product (P) which has been fabricated in a pharmaceutical reactor into a transport container (10). The container (10) is attached to the device (14) by a two door transfer system (26, 44). The device (14) permits the opening of the double doors, to empty the openings in front of the hopper and the container and to join the same automatically by means of telescoping delivery lines (66).

6 Claims, 7 Drawing Sheets

DEVICE FOR FORMING A VANE JOINING TWO CONTAINERS IN A WATER PROOF MANNER AND A DESIGN FOR ATTACHING A CONTAINER TO SUCH A DEVICE

BACKGROUND OF THE INVENTION

The invention refers to forming a transfer device, designed to be interjected between two containers so as to assure a moisture-proof attachment, without having to open up the containers to the atmosphere. Such a device can be utilized especially to assure the transfer of a product such as a powder between two containers in such a manner that at no time is the product exposed to the external environment.

The invention also relates to a particular type of container, conceived so that it can be attached to the waterproof transfer fixture mentioned earlier, so as to facilitate the transfer between the two containers.

It should be noted that the word "container" throughout the text refers to all waterproof containers which define a closed volume, whatever the shape or the dimensions of the volume.

In the current state of the technique, the transfer of powder products fabricated in pharmaceutical reactors into containers which serve to transport these products occurs by interjecting an isolating glove box between one of the discharge hoppers of the reactor and the container. An operator, having access by means of the integral gloves in the walls of the isolation box, manipulates a double door system so as to establish or to interrupt the communications of the isolation box with the reactor and with the container. When the two accesses are established, the operator, always, manually incorporates a flexible coupling which allows him to tie the discharge hopper of the reactor directly to the container across the isolation box.

This known approach is not convenient because it requires the use of expensive materials, requires a long time to implement and is not amenable to eventual automation.

The invention has as its specific purpose a device that is particularly adapted for waterproof attachment, and is not limited to the transfer of products between two containers. The original concept permits the reduction of costs in a sensible manner as well as the reduction of volume of such a device, to reduce the time necessary to establish a communication between the containers, and to permit the automation of the operations.

SUMMARY OF THE INVENTION

Pursuant to the invention, this result is obtained by means of a device forming a transfer duct, for the moisture-proof attachment of a removable container onto a fixed container, characterized by the fact that it consists of:

a waterproof coffer capable of being fixed to the stationary container, to communicate with it by a first opening, the coffer offering a second opening located face to face with the first opening, bounded by a flange and normally sealed by a door of the coffer, the said flange and the said door being able to work in unison, as a result of the joining mechanism, with a door from one of the removable containers, to form a water proof double door transfer system;

a sliding carriage located inside the water proof coffer and supportive of the coffer door;

means to actuate a movement of this door with respect to the sliding carriage, parallel to the axis of the door, between a closed position and an open position; and means to adjust the position of the sliding carriage in the waterproof coffer between a first position in which the door of the coffer is placed in front of the second opening and a second position in which this door is covered over with respect to the second opening while the door to the coffer is in an open position.

A device conceived thus can provide a relatively small encumbrance and does not require any intervention other than for the attachment of the containers to the flanges of the water proof coffer. In effect, the different opening movements and covering of the door can be controlled remotely in a simple fashion. The cost and the time required for attachment operations are appreciably reduced.

As has already been mentioned, the device according to this invention is notably conceived to be used so as to transfer a fluid product such as a powder between the two containers.

In this respect and therefore as a first mode of realization of the invention, the sliding carriage support, in addition to the extendable transfer duct is provided with a mechanism for controlling the elongation and the retraction, this transfer duct is aligned with the openings of the waterproof coffer while the sliding carriage occupies the second position.

In this case, the device consists of an automatic control circuit, activating successively the means for controlling a movement of the door with respect to the sliding carriage, the means for moving the sliding carriage in the coffer, and the means to control the extension of the extendible transfer duct.

By preference, the means for controlling the movement of the door parallel to its axis comprises a mobile piece carried by the sliding carriage and working in unison with the coffer door by a system of cams, means for guiding the door of the coffer parallel to an axis which is parallel to the said openings, and a means for moving the said piece with respect to the sliding carriage, in such a manner as to generate a movement of the door along the guides through the use of cams.

In the case where the removable container, which needs to be attached to the second opening, does not have a flange and an opening designed to be respectively coupled to the flange and to the door of the device corresponding to the second opening, an adapter can be attached to the removable container. This adapter consists of a rotating flange and a container door capable of interacting with the attachment mechanisms which is part of the flange and of the door of the waterproof coffer.

According to a second mode of realization of the invention, a transport container of a particular type is attached to the device. This container consists of an exterior envelope provided with a container flange which defines the opening of a container which is normally obscured by the door of the container, and which is capable of interacting with the attachment mechanisms of the flange and of the door to the waterproof coffer. The transport container comprises an interior envelope with a tubular portion near the opening of the container, and means for moving the interior envelope on the inside of the exterior envelope, between a covered position such that the door of the container can be closed, and a transfer position, from which the tubular portion is attached to the two openings of the waterproof attachment device.

BRIEF DESCRIPTION OF THE DRAWINGS

A description follows, as an example which is not limiting, of different modes of realizing the invention by referring to the attached schematics, in which.

DESCRIPTION OF THE PREFERRED EMBODIMENTS

Figure 1:
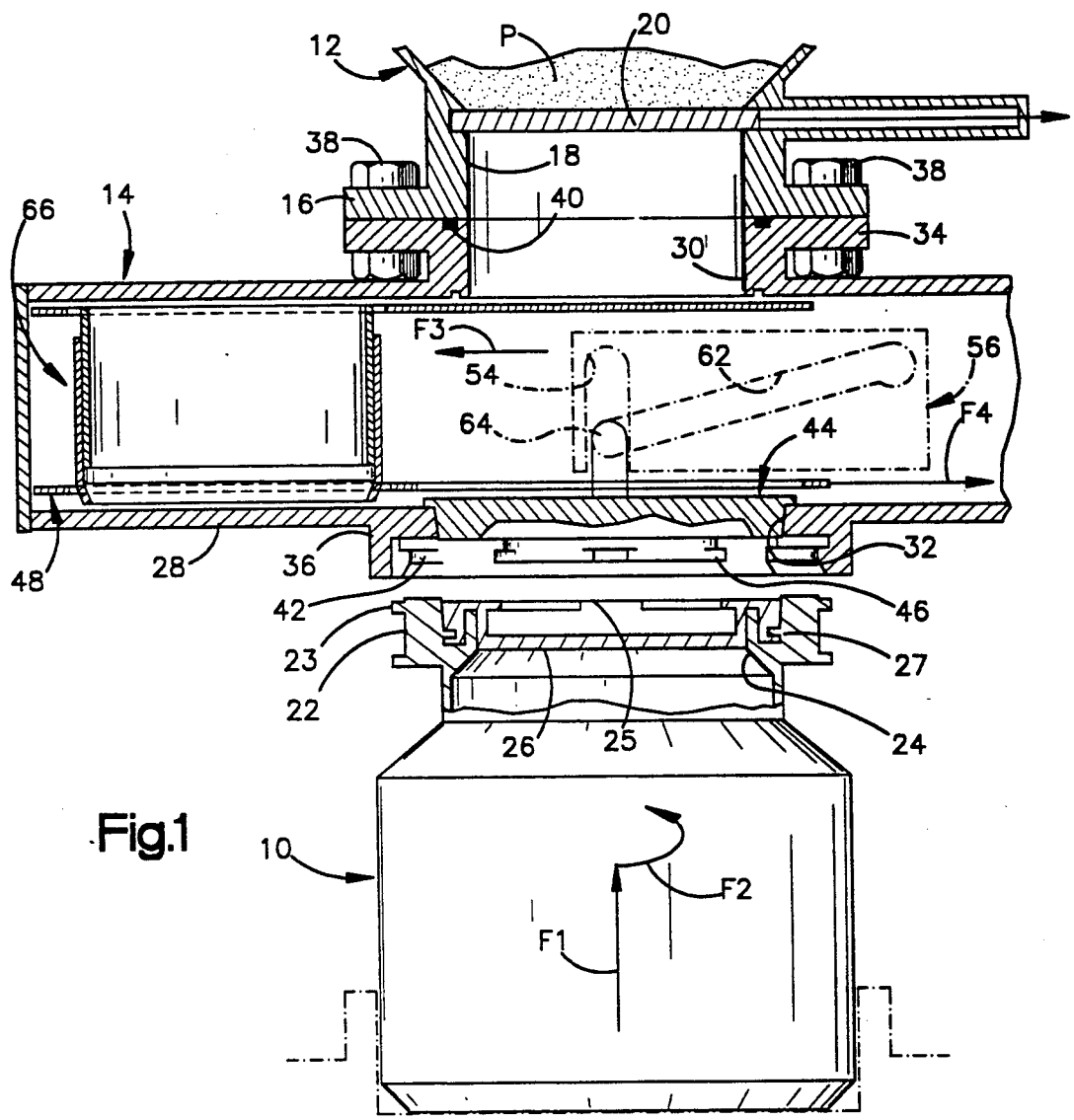
FIG. 1 is front view, with a cut-away, illustrating the coupling of a transport container on a hopper of a pharmaceutical reactor with the assistance of a waterproof attachment device conforming to the invention.

FIGS. 1 through 5, illustrate the attachment of a transport container 10 under the fixed hopper 12 of a pharmaceutical reactor, by the intermediation of moisture-proof attachment device which conforms to the invention, shown generally by referring to numeral 14. The attachment device 14 is fixed, in this case to the hopper 12, and provides means which allow for attaching the transport container 10 beneath this hopper, and opening simultaneously doors which block the transport container and the attachment device, and to remove these doors so as to join the hopper and the container by an extendible transfer duct thereby which serves to protect the mechanical portions of the device 10 during the powder transfer.

In the particular application of the invention illustrated in FIGS. 1 through 5, the hopper 12 has at its lower extremity a flange 16 for the hopper which defines the interior dimension of the opening 18, with a circular section with a vertical axis. The bottom of the hopper 12 is also equipped with a sliding closure mechanism consisting of a plate 20, controlled by a motor (not shown).

Elsewhere, the transport container 10 consists of a container flange 22 which defines an internal circular opening 24, normally closed by a door 26 by the intermediation of a bayonet type system 27. In addition, the flange 22 and the door 26 are designed to interact with a complementary flange and door, by interactive systems of bayonets 23, 25, so as to make up a transfer device with double doors, of a known type. In order to complete this device, the flange 22 has a moisture proof seal 29 having a triangular cross-section (FIG. 3), designed to work simultaneously with the door 26 and with a complementary flange.

The moisture-proof attachment device 14 consists of a waterproof coffer 28, totally enclosed, presenting two parallel opposing faces in which are two aligned circular openings facing each other 30 and 32, defined respectively by flanges 34 and 36.

The flange 34 is a flange in the shape of a disc, designed to be attached directly onto the flange 16 of the hopper 12, for example by means of bolts 38. The moisture-proof seal between the two flanges, for example, is assured by an annular waterproof joint 40 which is made between the two. In addition, the diameters of the openings 18, 24, and 30 are advantageously the same.

The flange 36 consists of attachment means such as a bayonet system 42 which can work with the bayonet system 23 of flange 22 of the transport container 10, under the effect of a rotation around the axis of the latter. The opening 32 defined by the flange 36 has a diameter larger than that of the openings 18, 30, 24.

Figure 3:
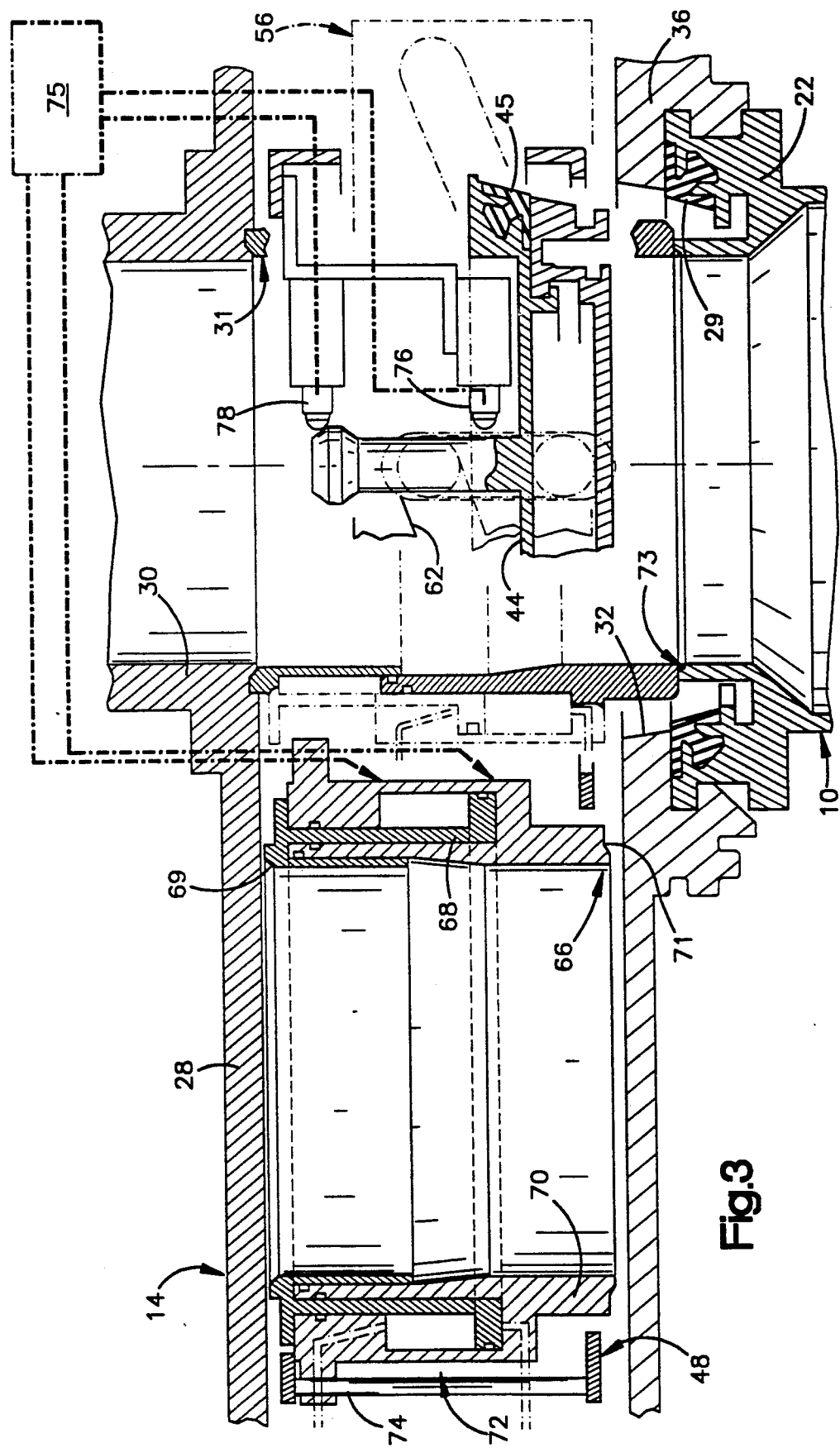
FIG. 3 is a cut-away expanded view from different vantages of the waterproof attachment device of FIG. 1.

A door 44 of the coffer normally provides a waterproof seal for the opening 32 defined by the flange 36. The water tightness is assured by the truncated cone shape of the surfaces that are in contact with the door 44 and of the opening 32. The door 44 is similarly equipped, on its face which is turned towards the exterior of the coffer 28, with means of attachment which consists of a bayonet system 46, which can interact with the bayonet system 25 of the door 26 of the container 10, under the effect of the previously discussed rotation of the container 10. As FIG. 3 illustrates, the door 44 supports a water proof joint 45, with a triangular cross-section, which is capable of inducing water tightness with the opening 32 formed by the flange 36 and against the door of the container 26.

At the end of the rotation of the container 10 which assures its attachment to the device 14, the rotation of the door 26 is stopped under the effect of its interaction with the door 44, which has the effect of disengaging the attachment of the bayonet 27 by which the door 26 was initially fixed to the flange 22. This characteristic is typical in waterproof transfer devices with two doors.

The waterproof attaching device 14 according to the invention also consists of, at the interior of the water proof coffer 14, a carriage 48 capable of moving in along a direction perpendicular to the axis which is common to openings 30 and 32. This movement is controlled by two pneumatic jack-screws 50 (FIG. 5), placed at the interior of the coffer 28 and whose extremities are attached respectively to the wall of the coffer and to the carriage 48. The guide way for the sliding carriage 48 during its movement in the interior of the coffer 28 is assured by slides 51 (FIG. 5) which are attached to the front and back walls of the coffer.

Figure 4:
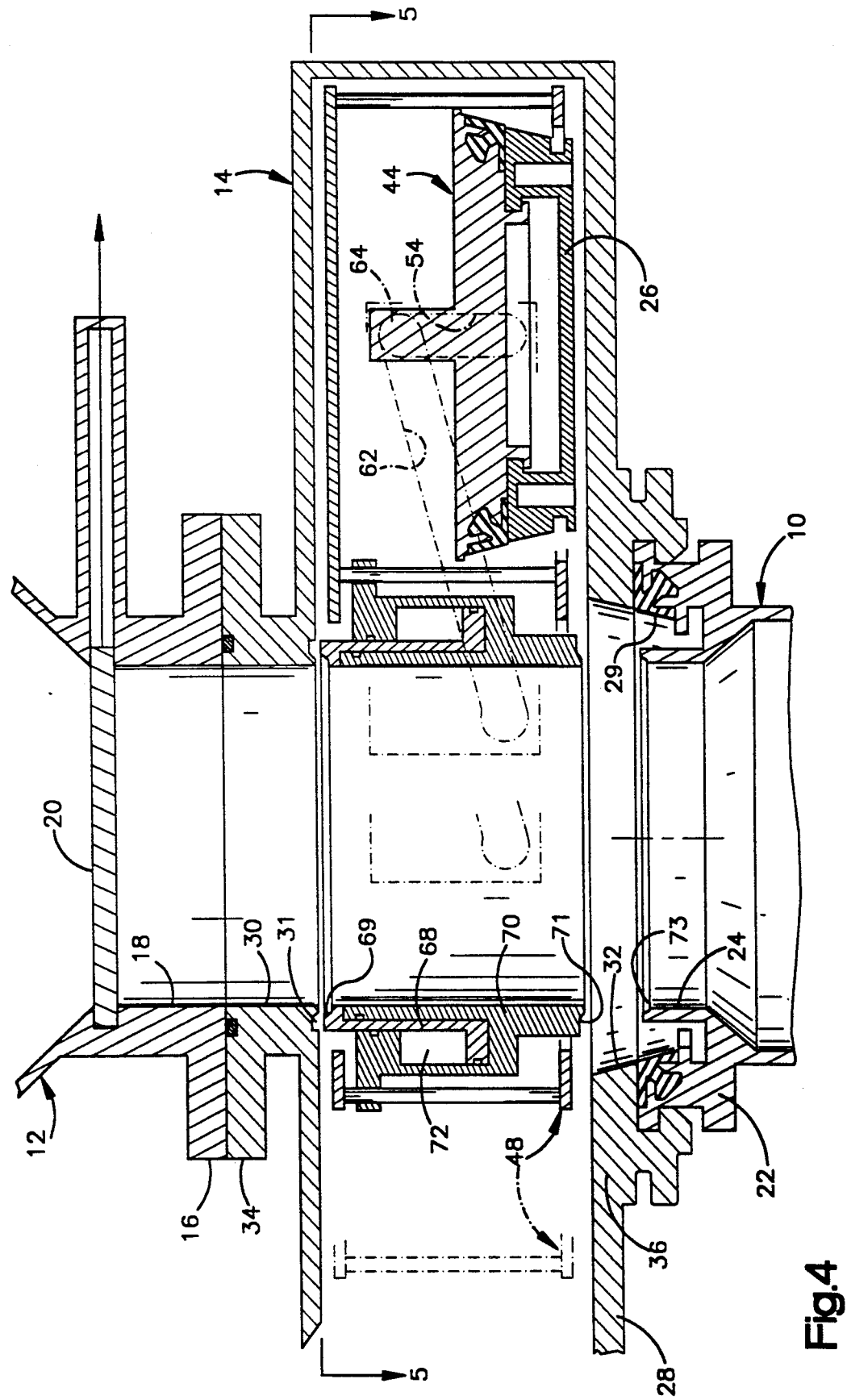
FIG. 4 is a cut-away view comparable to FIGS. 1 and 2, which represents the moisture-proof attachment device in a position which it occupies prior to the transfer of a product across this device.
Figure 5:
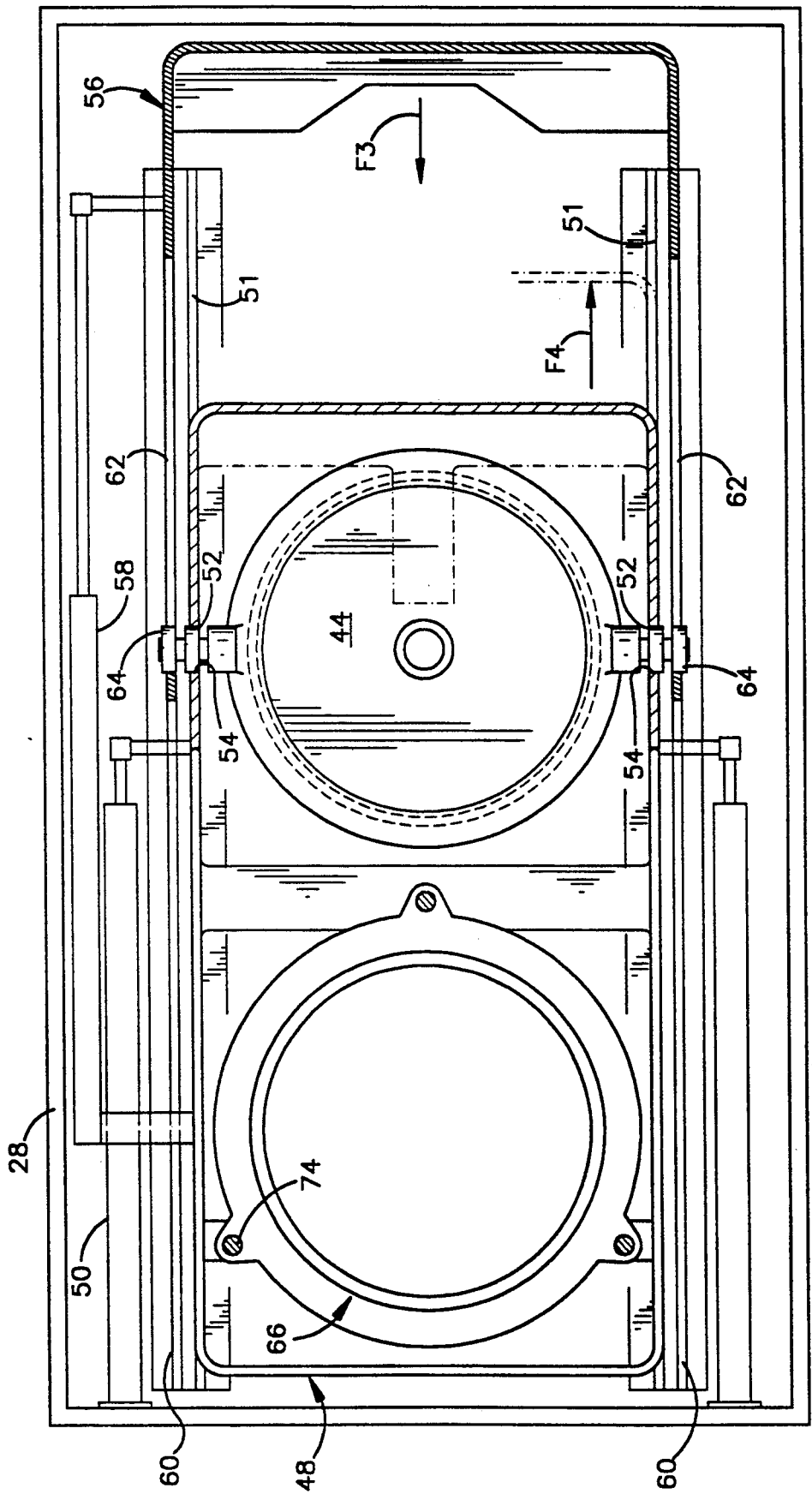
FIG. 5 is a cut-away view of the moisture-proof attachment device along the V—V reference of FIG. 4.

As specifically illustrated in FIGS. 4 and 5, the door 44 of the coffer 28 supports two friction rollers on its interior face 52 whose common axis is perpendicular to the axis of the openings 30 and 32 and which are guided by slots 54 formed in the lateral walls of the sliding carriage 48, parallel to the axis of these openings. This arrangement enables a movement of the door 44 along the common axis of the openings 30 and 32, while causing the door 44 to be joined with the sliding carriage 48 during the movement of this device when activated by the jacks 50.

A mobile piece 56, which functions to control the opening and closure of the door 44, is also placed in the interior of the coffer 28. As FIG. 5 clearly shows, this piece 56 presents the shape of a U as seen from above and is installed in the coffer 28 in a manner so as to allow itself to move in the same direction as the sliding carriage 48, all the while being attached to this latter item by pneumatic jack 58 which permit the actuation of the movement of the piece 56 with respect to the sliding carriage 48 along this direction. The guidance of the piece 56 along this direction is assured by shaped glides 60, in parallel to the glides 51, on the interior of the coffer 28, and the front and back walls of the latter.

The two parallel branches of the piece 56 which are U shaped, which run in the direction of the movement of this piece and of the sliding carriage 48, each comprise a slot 62, inclined with respect to the front and back faces of the coffer 28, as illustrated in FIG. 4, in a fashion so as to form a system of cams in which are installed the two friction rollers 64 supported by the door 44 which is coaxially positioned with respect to the friction rollers 52, as shown in FIG. 5.

In the manner of reduction to practice of the waterproof attachment device according to the invention illustrated in FIGS. 1 to 5, the sliding carriage 48 also supports an extendible transfer duct 66 whose axis is parallel to that of the openings 24 and 30. As illustrated in greater detail in FIGS. 3 and 4, this extendible transfer duct 66 is installed in the sliding carriage 48 in a location that is normally set off in the direction of movement of the latter in the interior of the coffer 28, when the door 44 is facing the openings 24 and 34. While the door 44 is opened under the action of the jack 58, the extensible transfer duct 66 can be brought into place between the openings 30 and 32 so as to accomplish the attachment.

As FIGS. 3 and 4 illustrate, the extensible transfer duct 66 consists of two separate sections of the transfer duct 68 and 70 installed one within the other in a telescopic fashion and maneuvered by a pneumatic jack 72. The actuation of this jack 72 allows either for bringing the transfer duct 66 into its retracted configuration as shown in full detail in the left hand portion of FIG. 3, or to position the transfer duct into its elongated position as illustrated in multiple detail in the right hand portion of FIG. 3. The interior portion 70 of the telescoping transfer duct 66, which forms the cylinder of the jack 72, is mounted to slide while guided by small columns 74 (FIG. 3) upon the sliding carriage 48, along a direction oriented parallel to the common axis for openings 30 and 32. This outer section 68 of the telescoping transfer duct 66, which includes the piston of the jack 72, is mounted over the interior section 70 in a manner so as to be able to move in the same direction.

The interior diameter of the telescoping transfer duct 66 is essentially equal to that of the openings 18, 24, and 30 (FIG. 3).

The implementation of the attachment device according to the invention will now be described, in the context of the illustrated example in FIGS. 1 to 5.

Initially, the device 14 is attached to the hopper 12 by the bolts 38 which pass through the flanges 16 and 34, as illustrated in FIG. 1. The door 44 is closed, which implies that the sliding carriage 48 finds itself in its first position illustrated in FIG. 1, in which the door 44 is aligned with the openings 30 and 32, and that the piece 56 occupies the position schematically illustrated on FIG. 1, in which the door 44 is applied in a waterproof fashion in the opening 32 under the effect of the interaction of the friction rollers 64 and the inclined guide ways 62.

When a powder product which was fabricated in the reactor affixed to the hopper 12 must be removed from the reactor, a container 10 is attached to the flange 36 by a translation movement (arrow F1) followed by a rotary movement (arrow F2). As described earlier, this last rotary movement has the effect of coupling flange 22 to flange 36, to couple the door 26 to door 44 and to unbolt door 26 from the flange 22.

When this coupling is terminated, the water proof attachment device according to the invention can be implemented in an entirely automatic fashion so as to assure rapid establishment of communication of hopper 12 with container 10 without breaking the seal with respect to the exterior of the device.

The jack 58 is activated, so as to cause movement of the piece 56 with respect to the sliding carriage (arrow F3 on FIGS. 1 and 5). During this movement, the inclined guide ways 62 moved because of their relation to the friction rollers 64, which has the effect of opening the door 44, by moving it towards the interior of the coffer 28. In effect, the movement of the door 44 is limited by the interaction between the friction rollers 52 and the guide ways 54 fashioned into the sliding carriage 48.

At the end of the motion of the piece 56, the door 44, as well as the door 26 of the container which becomes joined as a result of the attachment to the container 10, then finds itself in the open position, as illustrated on the right hand side of FIG. 3, in which the assembly created by the two doors 44 and 26 is totally closed off in the interior of the coffer 28.

Figure 2:
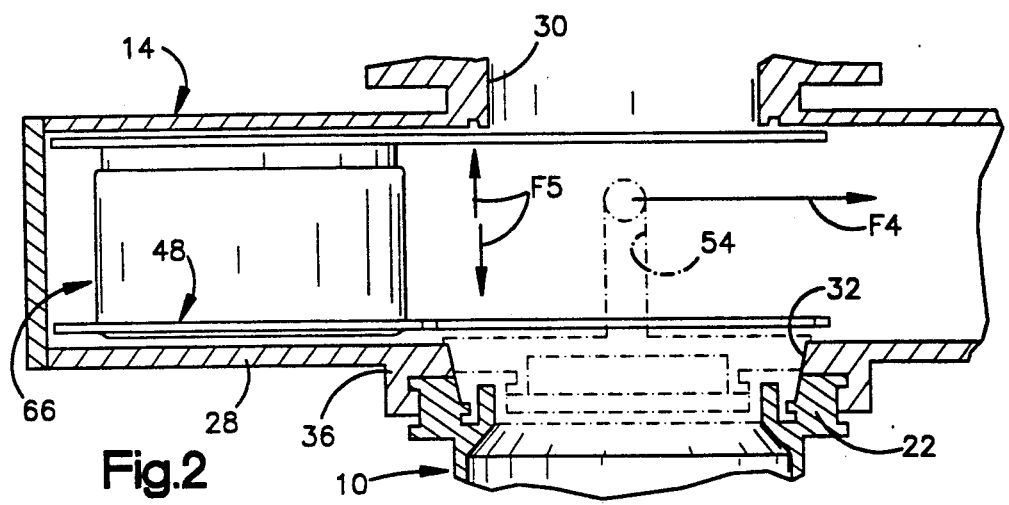
FIG. 2 is a view comparable to FIG. 1, which illustrates in a very schematic manner the different functions fulfilled by the device for creating a waterproof attachment to the hopper of FIG. 1.

When this first motion is completed, the jack 58 is stopped and the two jacks 50 are in their turn actuated, which has the effect of moving simultaneously, in the interior of the coffer 28, the sliding carriage 48 which carries the piece 56 and the two doors 44 and 26 (arrow F4 in FIGS. 1 and 2). This motion causes the carriage 48 to move from its initial position in which the door 44 was aligned with the openings 30 and 32 to its second position, illustrated in FIG. 4, in which the doors 44 and 26 are totally sealed off with respect to the openings 30 and 32.

In the realization illustrated in FIGS. 1 to 5, this second position of the sliding carriage 48 is also characterized by the arrival of the telescoping transfer duct 66 as an extension of the openings 30 and 32. The jack is then actuated in a manner so as to initiate the extension of the telescoping transfer duct 66 (arrows F5 on FIG. 2). As shown in multiple detail in the right hand portion of FIG. 3, this elongated is limited by the arrival and application of an opening in the shape of a truncated cone 69 created in the upper portion of the duct 68 against a complementary truncated cone opening 31 formed around the opening 30 on the interior face of the coffer 28, and by the arrival and use of a truncated conical opening 71 formed on the lower extremity of the truncated cone 70 against a complementary truncated cone opening 73 formed over a tubular portion of the container 10 around the opening 24.

As this contact is achieved, the powder product (P) which is contained in hopper 12 can be transferred into a container 10 without the mechanism contained in the coffer 28 being contaminated by the powder product.

In the application illustrated on FIGS. 1 to 5, this transfer is accomplished by gravity, by opening the sieve 20 which covers the bottom of the hopper 12. When the process is completed, the reverse of the previous operations permits the interior elements of the attachment device 14 to return to the positions that they occupied initially, after which the container 10 can be disconnected from this device.

Because of the utilization of the waterproof attachment device 14 according to the invention, a transfer of powder product can be completed without any break in the confinement with respect to exterior environment between a hopper 12 and a transport container 10. With respect to the glove box which was used previously to serve the same function, the attachment device of this invention is particularly simple, inexpensive, not cumbersome, and can be utilized quite rapidly.

In addition, this device is particularly adapted so as to be able to be easily automated. To this end, it includes an automatic control circuit 75 (FIG. 3) which controls successively the actuation of the jacks 58, 50 and 72 when the first mechanism is actuated, following the attachment of the container 10 upon the device 14. A command can also be initiated automatically by the closure of a micro switch which indicates that the container has been attached. The automatic control circuit 75 also controls the return of the device 14 back to its original condition, where a second control circuit is activated.

The beginning and the end of the actuation of each of the jacks 58, 50 and 72 are controlled by circuit 75 in response to signals delivered by micro switches indicating the end of the run. Therefore and as illustrated in FIG. 3, two end of process micro switches 76 and 78, mounted on the carriage 48, indicate to the control circuit 75 respectively the closed position and the open position of door 44. In the same manner, micro switches (not shown) are installed in the coffer 28, so as to detect the first and second positions of the carriage 48 and micro switches (not shown) are attached to the carriage so as to detect the retracted and the elongated status of the telescopic transfer duct.

Figure 6:
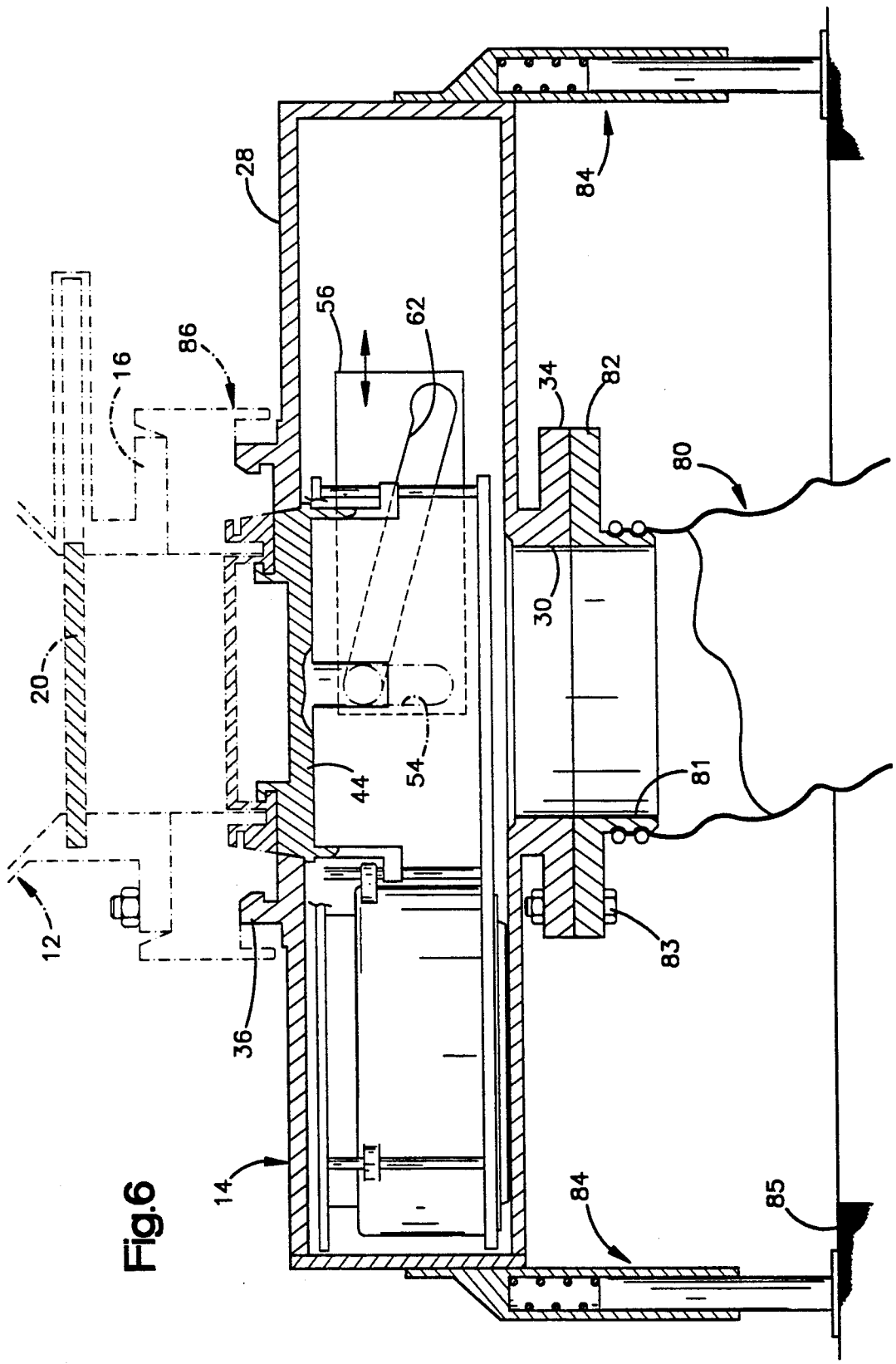
FIG. 6 is a front view which represents schematically the inverse installation of the moisture-proof attachment device illustrated in the preceding figures, on a fixed support which is attached on a receiving container for powder products and for the attachment of this device onto the removable hopper that is equipped with an adapter.
Figure 7:
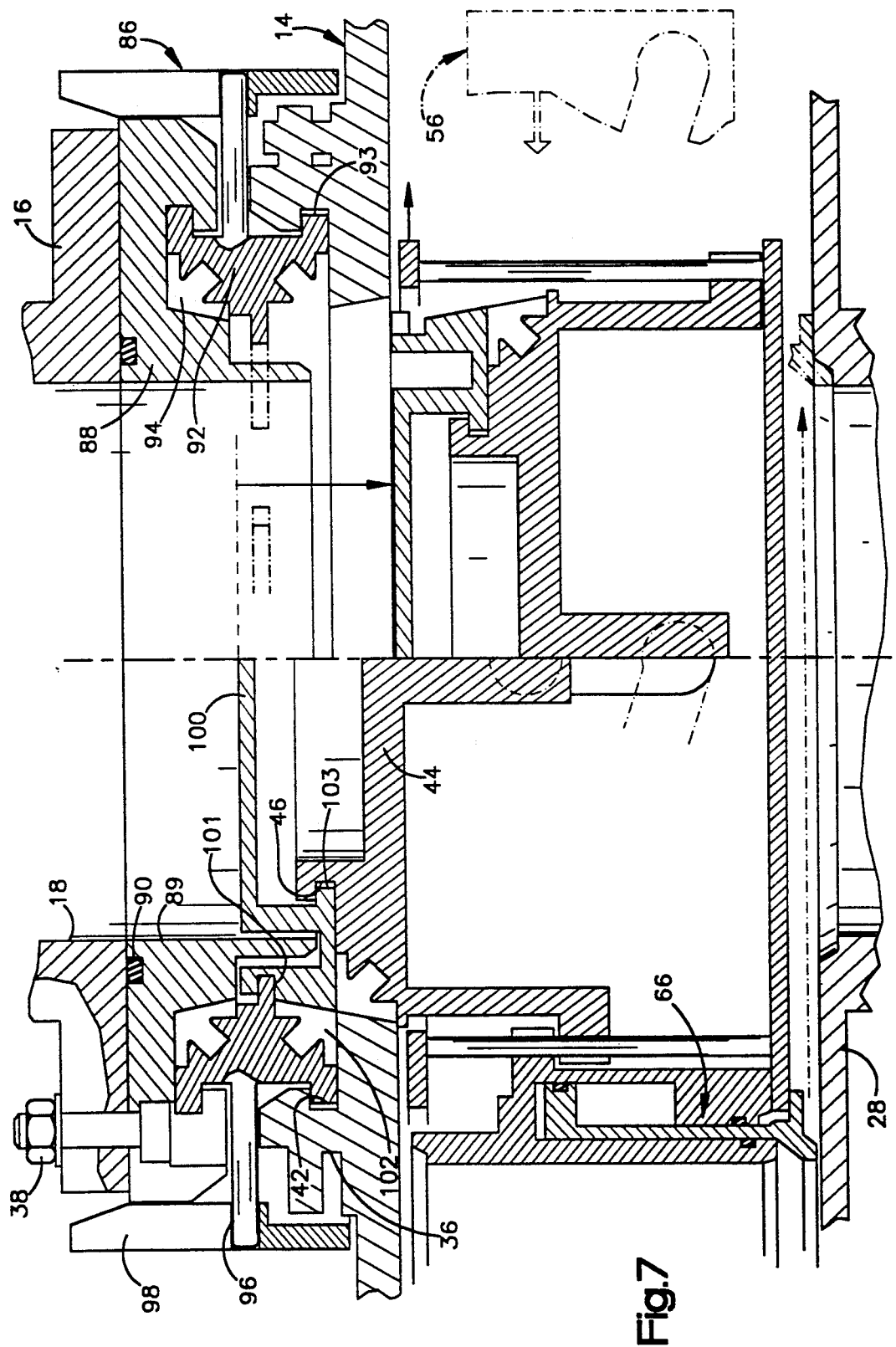
FIG. 7 is a cut-away expanded view representing the adapter used in FIG. 6.

As illustrated in FIG. 6 and 7, the transfer device 14 of the invention can also be utilized in the reverse manner, to assure the transfer of a powder product from of a mobile hopper 12 to a fixed container (not shown), which is attached by a flexible sleeve 80 to a flange 82 which defines the circular opening 81, which is of the same diameter as the opening 30. In this case, the flange 34 of the device 14 is turned towards the base and the flange 82 can be fixed in position by bolts 83. The sealed coffer 28 of the device 14 rests directly on the base 85 by means of feet 84 equipped with adjustment devices or levelers so as to allow for a certain amount of adjustment of the device 14 in the vertical direction.

Given that the hopper 12 has a flange 16 at the lower end identical to that which was previously described by referring to FIG. 1, it is necessary to affix to this flange an adapter 86 so that the hopper 12 can be attached and detached from the flange 36, as well as the door 44 which covers the opening 32 which is defined by this flange 36. This adapter 86 will be described in more detail by referring to FIG. 7.

As this last figure illustrates, the adapter 86 consists of a ring 88 which is affixed to the flange 16 by bolts 38, the seal being assured by an annular waterproof joint 90 which is encased between the ring 88 and the flange 16. The ring 88 defines a circular opening 89 where the diameter is equal to that of the opening 18 which is defined by the flange 16. A rotating flange 92, supported by the ring 88, interacts first by means of a water proof joint 94 with a triangular cross-section with an exterior surface with a V shaped section of the ring 88. A key 96 is radially oriented outwards from the rotating flange 92, which permits the formation of the joint through the rotation of this latter by means of an external maneuvering ring 98.

A door 100 covers a tubular portion of the ring 88 which is opposite to the flange 16 and interacts by means of a union of the bayonet 101 with the rotating flange 92. A second water proof joint 102 with a triangular cross-section, supported by the rotating flange 92, is normally applied in a water proof manner to the external truncated cone surface of the door 100 and can create a water-tight joint on the flange 36 of device 14.

On the other hand, the rotating flange 92 as well as the door 100 are capable of interacting by means of bayonet connections 93 and 103 respectively with bayonet connections 42 and 46 with provisions on flange 36 and on door 44 of the attachment device 14 according to the invention, so as to permit the coupling of the mobile hopper 12 on this device 14, as illustrated in FIG. 7.

More precisely, this coupling is achieved by movement of the hopper 12 towards the bottom, then by directing the turning of the rotating flange 92 with the help of the maneuvering ring 98, which has the effect of locking the flange 92 onto flange 36, to lock door 100 onto the door 44, and to unlock door 100 from the rotating flange 92.

The transfer device 14, otherwise achieved in the manner previously described, can then be applied to permit the transfer by gravity of the powder product from the hopper 12 into the container that is attached to the coupler 80.

Figure 8:
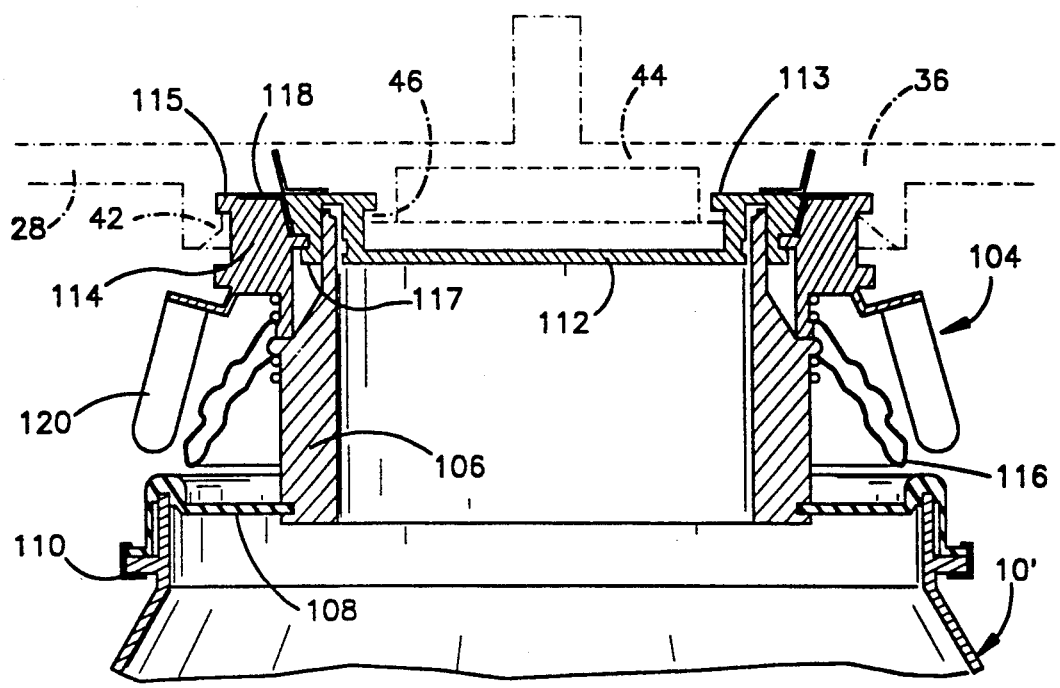
FIG. 8 illustrates, in a manner similar to that of FIG. 1, the attachment of a transport container to the transfer device by means of an adapter affixed to the container; and, FIG. 9 illustrates the attachment of a special container adapted for powder product transfer, according to a second mode of realization of the invention, onto a simplified transfer device which is not provided with an extendible delivery duct.

As shown in a schematic fashion in FIG. 8, the attachment device 14 which conforms to the invention can also be used, in the same way as in FIGS. 1 to 5, so as to assure the transfer of a powder from a fixed hopper into a transport container 10', which is not adapted for being directly coupled to flange 36 of device 14. In this case, an adapter 104 is attached to the opening of the container 10'.

This adapter 104 consists of a tubular opening 106 which is attached in a water tight manner to the opening of the container 10' by all appropriate means such as, for example, by an annular plate 108 that is retained by a clip 110.

The end of the tubular opening 106 is covered in a water-tight fashion by a door 112 designed to interact by means of a link of bayonet 113 with the complementary link 46 with door 44 of the device 14. An external rotating flange 114 is attached around the perimeter of the end of the tubular piece 106 and around door 112. The flange 114 interacts with the door 112 by means of a link with bayonet 117. The water proof around the tubular piece 106 and the rotating flange 114 is assured by a flexible connection 116. Elsewhere, the water tightness between the rotating flange 114 and the door 112 is assured by a water proof joint 118 with a triangular cross-section which normally makes a water proof seal with the exterior surface of the truncated cone of the door 112 and which can make a water tight seal against flange 36 of device 14 while the rotating flange 114 is coupled by the link to bayonet 42 of flange 36 by a complementary link. The initiation of rotation of flange 114 is facilitated by manipulating arms 120 attached to this flange.

While the adapter 104 is attached to container 10′, it is possible to couple the latter to the attachment device 14 by initiating in succession a movements of the container which brings it into contact with the flange 36, and then followed by a rotation of the rotating flange 114. As in the applications which were previously described, this rotation has the effect of coupling the flange 114 to flange 36, to couple door 112 onto door 44 and to decouple door 112 from flange 114. Transfer operations can then be performed by actuating the device 14 in the manner previously described by referring to FIGS. 1 to 5.

Figure 9:
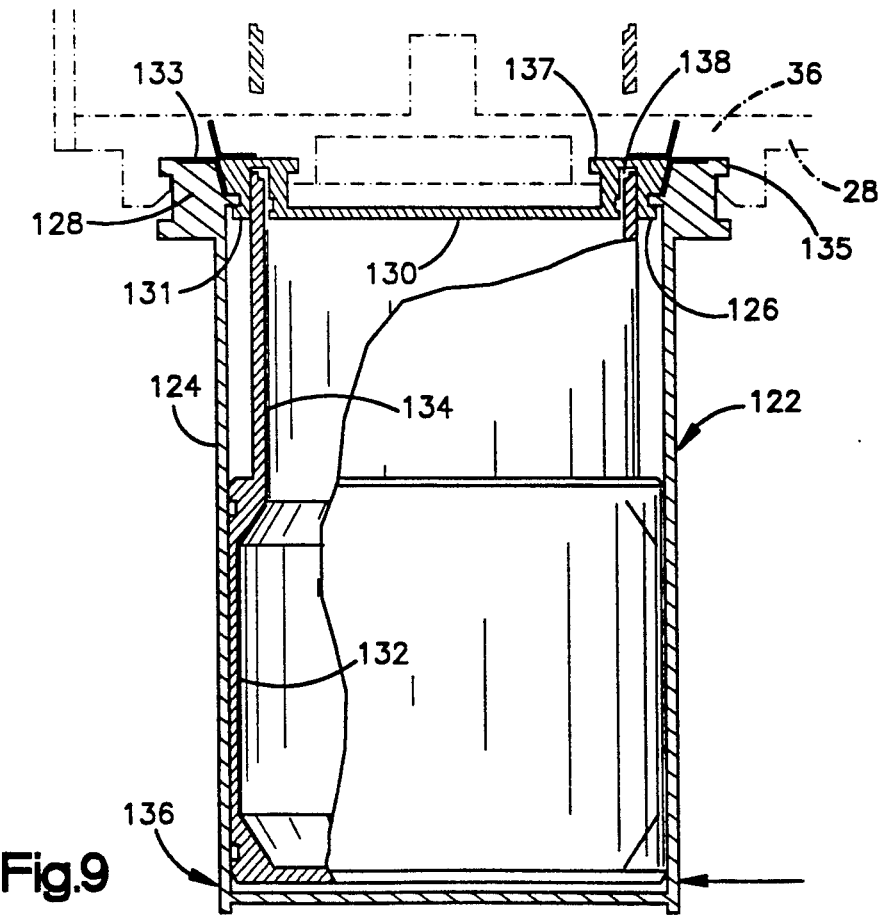

In FIG. 9, another mode of implementation is represented, in which the transfer device 14 is achieved for the essence of the previously described implementation by referring: to FIGS. 1 to 5, but in which the telescoping tubular duct is omitted. This omission is made possible through the use of a container 112 of a special design.

The container 122 consists, in classical fashion, of an exterior envelope 124, for example of cylindrical shape, where one end has an opening 126 defined by a flange 128. In true classical fashion, this opening 126 is normally covered over by door 130 which interacts with flange 128 through a link with bayonet 131. The water tightness is assured by a waterproof joint 133, with a triangular cross-section, mounted in the flange 128 and interacting in a sealing fashion with door 130 and with flange 36 of device 14, while the attachment is being accomplished. On the other hand, the flange 128 and the door 130 are dimensioned in a manner so as to respectively be able to coupled through links to the bayonets 42 and 46 of flange 36 and of the door 44 of the attachment device 14 through two complementary link 135 and 137.

The container 122 in addition, consists of an interior envelope 132, for example the tubular shape, which is mounted in a fashion so as to be able to slide within the interior envelope 124, parallel to the axis of opening 126. The interior envelope 132 interacts with the exterior envelope 124 in such a fashion so as to form between them a jack assembly 136 which allows for controlling the displacement of the interior envelope 132 from a normal position, in which this envelope is totally retracted into the interior of the exterior envelope 124, and a transfer position, in which, after the lifting of the door 130, a tubular portion 134 of the interior envelope 132 assures the guidance of the transferred product from the hopper 12 to the container 122, on the inside of device 14. In this last position, a truncated cone surface 138 formed at the end of the tubular section 134 comes into contact against the truncated cone surface 31 formed in the wall of the coffer 28, around the opening 30.

In this second realization of the invention, after implementing the device 14 with the effect of opening the doors 44 and 130, and then to cover them on the interior of the coffer 28 so as to completely discharge the passage between the opening 30 and the opening 126, the jack 136 for the container 122 is actuated in a manner of bringing the tubular portion 134 to a point above with respect to FIG. 9. The transfer of the powder product contained in hopper 12 towards the container 122 can thereby be accomplished.

It is well understood that, the invention is not limited to the modes of realization which have just been described as examples, but also include all variations. Thus, opening 30 of device 14 can, in certain cases, also be covered by a door where its opening is activated simultaneously to that of door 44, through the movement of the piece 56.

We claim:

1. A device that forms a valve, for the fluid-tight attachment of a removable container onto a fixed container, comprising:
   a fluid-tight coffer capable of being affixed onto the fixed container and having a first opening to communicate with the fixed container, the coffer having a second opening located in front of the first opening and defined by a flange, a coffer door for closing the second opening, and attachment means for the flange and the coffer door adapted to interact with a flange and a door of the removable container, so as to form a double door, fluid-tight transfer system;
   a carriage located within the coffer and supporting the coffer door;
   control means for displacing the coffer door with respect to the carriage, parallel to an axis of the coffer door, between a closed position and an open position; and
   means for moving the carriage inside the coffer between a first position in which the coffer door is placed in front of the second opening and a second position in which the coffer door is out of line with respect to the second opening while the coffer door is in the open position.

2. A device according to claim 1, in which the carriage also supports a telescoping transfer duct equipped with means for controlling its extension and retraction, this transfer duct being aligned with said openings when the carriage occupies the second position.

3. A device according to claim 2, further comprising an automatic control circuit which actuates successively the control means, the means for moving the carriage inside the coffer, and the means for controlling the extension of the telescoping transfer duct.

4. A device according to claim 1, in which the control means comprise a mobile piece carried on the carriage, a system of cams provided between said piece and the coffer door, guiding means for guiding the coffer door within the coffer in a direction parallel to an axis that is common to that of the openings, and means for moving said piece with respect to the sliding carriage so as to initiate a displacement of the coffer door along said guiding means through the system of cams.

5. A device according to claim 1, comprising an adapter adapted to be affixed onto a removable container destined to be attached to the second opening, this adapter including a rotating flange and a container door capable of interacting with the attachment mechanism of the flange and of the coffer door.

6. A transport container designed so as to be coupled to a fluid-tight attachment device forming a valve comprising:
   a fluid-tight coffer capable of being affixed to a fixed container and having a first opening to communicate with said fixed container, the coffer having a second opening located in front of the first opening and defined by a flange, a coffer door for closing the second opening, and attachment means for the door adapted to interact with a flange and a door of the transport container so as to form a double door, fluid-tight transfer system;

a carriage located within the coffer and supporting the coffer door;

control means for displacing the coffer door with respect to the carriage, parallel to an axis of the coffer door, between a closed position and an open position; and means for moving the carriage inside the coffer between a first position in which the coffer door is placed in front of the second opening and a second position in which the coffer door is out of line with respect to the second opening, while the coffer door is in the open position;

said transport container comprising:

an exterior envelope having a container flange which defines a container opening which is normally closed by a container cover and is adapted to interact with the attachment means of the flange and of the coffer door;

an interior envelope including a tubular portion adjacent to the container opening; and means for displacing the interior envelope within the exterior envelope, between a concealed position in which the container door can be closed, and a transfer position, in which the tubular portion connects the first and second openings of the fluid-tight attachment device.

* * * * *